US011540355B2

(12) United States Patent
Sabella et al.

(10) Patent No.: US 11,540,355 B2
(45) Date of Patent: Dec. 27, 2022

(54) MEC-BASED DISTRIBUTED COMPUTING ENVIRONMENT WITH MULTIPLE EDGE HOSTS AND USER DEVICES

(71) Applicant: Intel Corporation, Santa Clara, CA (US)

(72) Inventors: Dario Sabella, Munich (DE); Ned M. Smith, Beaverton, OR (US); Neal Oliver, Portland, OR (US); Kshitij Arun Doshi, Tempe, AZ (US); Suraj Prabhakaran, Aachen (DE); Francesc Guim Bernat, Barcelona (ES); Miltiadis Filippou, Munich (DE)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/995,011

(22) Filed: Aug. 17, 2020

(65) Prior Publication Data

US 2021/0100070 A1 Apr. 1, 2021

Related U.S. Application Data

(63) Continuation of application No. 16/235,685, filed on Dec. 28, 2018, now Pat. No. 10,757,757.
(Continued)

(51) Int. Cl.
*H04W 88/18* (2009.01)
*H04L 67/10* (2022.01)
(Continued)

(52) U.S. Cl.
CPC ............ *H04W 88/182* (2013.01); *G06F 8/70* (2013.01); *G06F 9/45533* (2013.01);
(Continued)

(58) Field of Classification Search
CPC ... H04W 88/182; H04W 4/44; H04W 12/009; H04W 48/08; H04W 88/16; H04W 84/12;
(Continued)

(56) References Cited

U.S. PATENT DOCUMENTS 10,757,757 B2 8/2020 Sabella et al.
2018/0183855 A1* 6/2018 Sabella ................. G06F 9/5027
(Continued)

FOREIGN PATENT DOCUMENTS

| CN | 112740181 | 4/2021 |
| WO | 2020068238 | 4/2020 |

OTHER PUBLICATIONS

"Mobile Edge Computing (MEC); Framework and Reference Architecture", ETSI GS MEC 003 V1.1.1 (Mar. 2016), (2016), 18 pgs.
(Continued)

*Primary Examiner* — Ashley Shivers
(74) *Attorney, Agent, or Firm* — Schwegman Lundberg & Woessner, P.A.

(57) ABSTRACT

Various systems and methods for enhancing a distributed computing environment with multiple edge hosts and user devices, including in multi-access edge computing (MEC) network platforms and settings, are described herein. A device of a lifecycle management (LCM) proxy apparatus obtains a request, from a device application, for an application multiple context of an application. The application multiple context for the application is determined. The request from the device application for the application multiple context for the application is authorized. A device application identifier based on the request is added to the application multiple context. A created response for the device application based on the authorization of the request is transmitted to the device application. The response includes an identifier of the application multiple context.

22 Claims, 14 Drawing Sheets

Related U.S. Application Data

(60) Provisional application No. 62/738,964, filed on Sep. 28, 2018.

(51) Int. Cl.

| | | |
|---|---|---|
| H04W 48/08 | (2009.01) | |
| H04L 9/40 | (2022.01) | |
| H04W 4/44 | (2018.01) | |
| H04W 88/16 | (2009.01) | |
| H04L 41/5019 | (2022.01) | |
| H04L 67/00 | (2022.01) | |
| G06F 9/455 | (2018.01) | |
| H04L 67/12 | (2022.01) | |
| H04L 41/083 | (2022.01) | |
| G06F 8/70 | (2018.01) | |
| H04W 12/00 | (2021.01) | |
| H04L 67/55 | (2022.01) | |
| H04W 84/12 | (2009.01) | |

(52) U.S. Cl.
CPC ........ *H04L 41/083* (2013.01); *H04L 41/5019* (2013.01); *H04L 63/08* (2013.01); *H04L 67/10* (2013.01); *H04L 67/12* (2013.01); *H04L 67/34* (2013.01); *H04L 67/55* (2022.05); *H04W 4/44* (2018.02); *H04W 12/009* (2019.01); *H04W 48/08* (2013.01); *H04W 88/16* (2013.01); *H04L 63/10* (2013.01); *H04W 84/12* (2013.01)

(58) Field of Classification Search
CPC ...... G06F 8/70; G06F 9/45533; G06F 9/5072; H04L 41/083; H04L 41/5019; H04L 63/08; H04L 67/10; H04L 67/12; H04L 67/26; H04L 67/34; H04L 63/10
See application file for complete search history.

(56) References Cited

U.S. PATENT DOCUMENTS

2018/0263039 A1* 9/2018 Fang ................ H04W 72/0486
2019/0141610 A1 5/2019 Sabella et al.

OTHER PUBLICATIONS

"Mobile Edge Computing (MEC); UE application interface", ETSI GS MEC 016 V1.1.1, (Sep. 2017), 21 pgs.

"International Application Serial No. PCT US2019 039949, International Search Report dated Sep. 30, 2019", 4 pgs.

"International Application Serial No. PCT US2019 039949, Written Opinion dated Sep. 30, 2019", 7 pgs.

"Multi-access Edge Computing (MEC); UE application interface", ETSI Draft Specification; MEC 016, European Telecommunications Standards Institute (ETSI), 650, Route Des Lucioles; F-06921 Sophia-Antipolis ; France vol. ISG MEC Multi-access Edge Computing, No. V2.0.2, (Sep. 26, 2018), 1-23.

"Mobile Edge Computing (MEC); UE application interface", ETSI Draft; Draft ETSI GS MEC 016, European Telecommunications Standards Institute (ETSI), 650, Route Des Lucioles ; F-06921 Sophia-Antipolis ; France vol. ISG-MEC, No. V1.0.1, (Aug. 21, 2017), 1-22.

"Mobile Edge Computing (MEC); UE application interface", ETSI Draft Specification; MEC 016, European Telecommunications Standards Institute (ETSI), 650, Route Des Lucioles ; F-06921 Sophia-Antipolis ; France vol. ISG MEC Multi-access Edge Computing, No. V1.0.2, (Aug. 23, 2017), 1-22.

"U.S. Appl. No. 16/235,685, Non Final Office Action dated Jan. 9, 2020", 16 pgs.

"U.S. Appl. No. 16/235,685, Response filed Apr. 8, 2020 to Non Final Office Action dated Jan. 9, 2020", 11 pgs.

"U.S. Appl. No. 16/235,685, Notice of Allowance dated Apr. 16, 2020", 9 pgs.

U.S. Appl. No. 16/235,685 U.S. Pat. No. 10,757,757, filed Dec. 28, 2018, MEC-Based Distributed Computing Environment With Multiple Edge Hosts and User Devices.

"International Application Serial No. PCT US2019 039949, International Preliminary Report on Patentability dated Apr. 8, 2021", 10 pgs.

* cited by examiner

MEC-BASED DISTRIBUTED COMPUTING ENVIRONMENT WITH MULTIPLE EDGE HOSTS AND USER DEVICES

PRIORITY CLAIM

This application is a continuation of U.S. patent application Ser. No. 16/235,685, filed Dec. 28, 2018 (now U.S. Pat. No. 10,757,757, issued on Aug. 25, 2020), which claims the benefit of priority to U.S. Application Ser. No. 62/738,964, filed Sep. 28, 2018, each of which is incorporated herein by reference in its entirety.

TECHNICAL FIELD

Embodiments described herein generally relate to edge computing and related distributed computing environments, and in particular, to security, verification, and management techniques usable with services operable at edge computing platforms.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing." MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, coordination, and resource management, especially in complex mobility settings where many participants (devices, hosts, service providers, operators) are involved. As a result, many proposed architectures have not achieved the full benefits that edge computing is intended to offer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
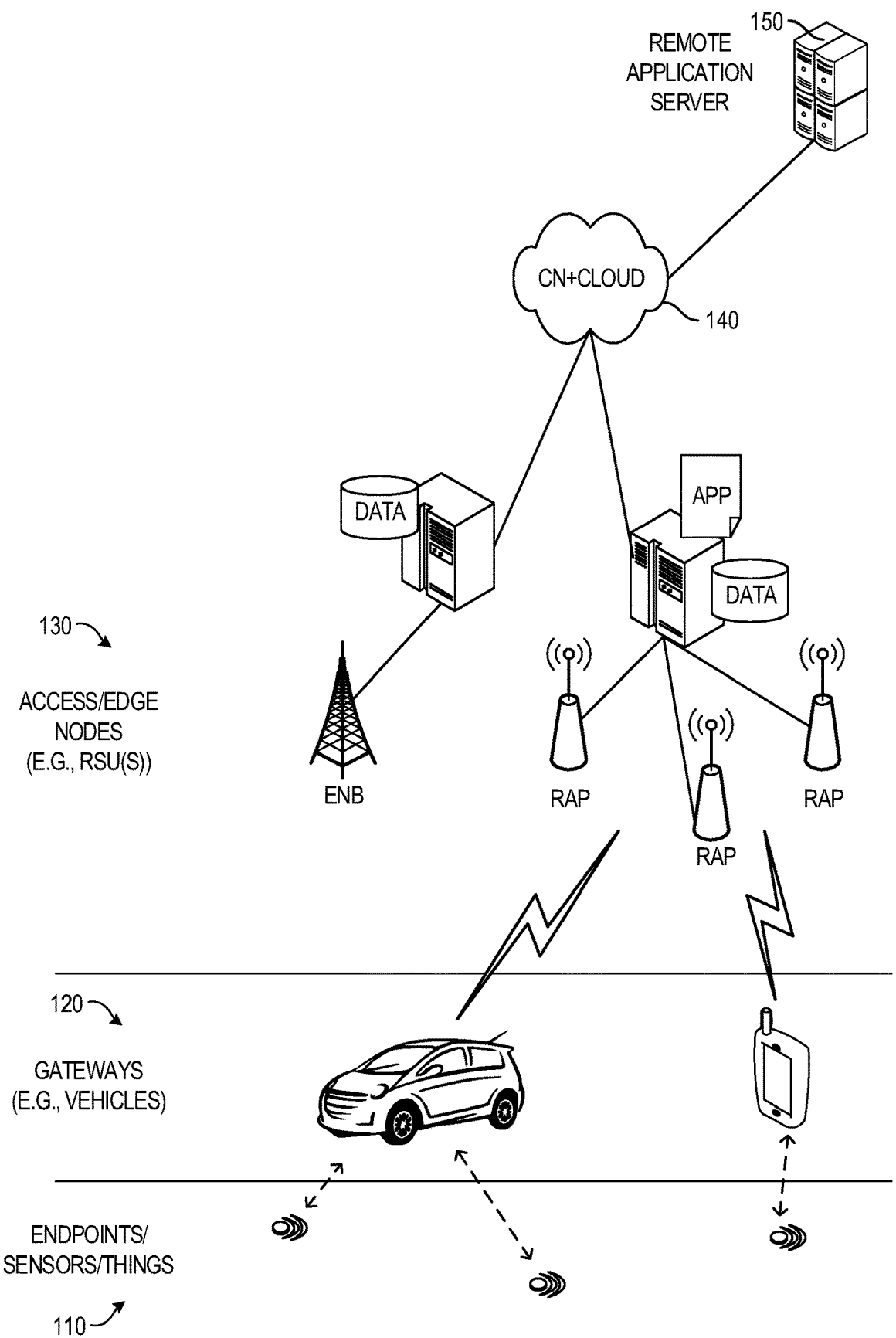
FIG. 1 illustrates devices and network entities in a dynamic communications environment, according to an example.

In the following description, methods, configurations, and related apparatuses are disclosed for enhancing a distributed computing environment with multiple edge hosts and user devices, including in multi-access edge computing (MEC) network platforms and settings. The disclosed distributed MEC application/service framework, customers (including consumers with low-end UEs but also companies deploying IoT devices and other types of UEs) are able to delegate tasks in the edge cloud, without the need to overprovision radio/computational/resources in the device itself, which is often not feasible by design, due to strict requirements in terms of power consumption and/or long battery life constraints.

Various examples describe a MEC-based enhancement, introducing data structures and procedures able to support the creation, joining, deletion and update of sub-clouds of applications instances, e.g., Application Multiple Contexts. A sub-cloud includes a set of device application running on user equipment and a set of MEC application running on MEC hosts. A sub-cloud allows information to be shared across the device applications and MEC applications.

Various examples address sophisticated and/or computationally demanding requests from a device application via the Mx2 reference point in the MEC system to instantiate distributed cloud resources. The requests may include requests from software instances/services running across multiple MEC hosts and multiple UEs. These cloud resources may be either replicated or shared, and identifying distinctive capabilities. To address such service consumption requests, a protocol that discovers information parts and collects telemetry information from individual nodes which are in hold of these information parts may be used. Various examples describe a publish and subscribe protocol to flexibly define/replace/update the mentioned sub-clouds, a publish/subscribe method between the MEC hosts in different locations allowing extension or replacement of the nodes of a sub-cloud, which may be initiated by the MEC hosts for various reasons such as mobility of UE application, service migration, service backup, as well as for load-balancing, energy consumption reduction etc.

The present techniques support a variety of edge computing installations, by enabling validated services to be offered to and investigated by application endpoints, which offers an improvement in security and operability. The present techniques may also extend the ability of an edge environment and individual entities to improve performance of computing and network resources, and achieve reliable edge services with low latency or at a high bandwidth.

The following systems and techniques may be implemented in, or augment, a variety of distributed, virtualized, or managed networking environments. These include environments in which network services are implemented within using MEC platforms, network function virtualization (NFV), or fully virtualized 4G/5G network configurations. Thus, various references are made to defined types of telecommunications equipment and architectures. Additionally, in the present disclosure, reference is made to LTE, 5G, eNBs, gNBs, and like radio access network concepts, but it is intended that the present techniques may be utilized with variations or substitution of the type of network deployed. (For example, all described solutions referencing LTE may also be applicable in new radio (NR)/5G or like next generation systems).

FIG. 1 illustrates devices and network entities in a multi-access communications environment. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 150 or other cloud services.

As shown, in the scenario of FIG. 1, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the environment may involve aspects of Vehicle-to-Infrastructure (V2X), Vehicle-to-Vehicle (V2V) and Vehicle-to-Infrastructure (V2I) services from vehicle user equipment (UE) or human-operated portable UEs (e.g., mobile smartphones and computing devices), which introduces significant complexity for computing services and network usage.

Figure 2:
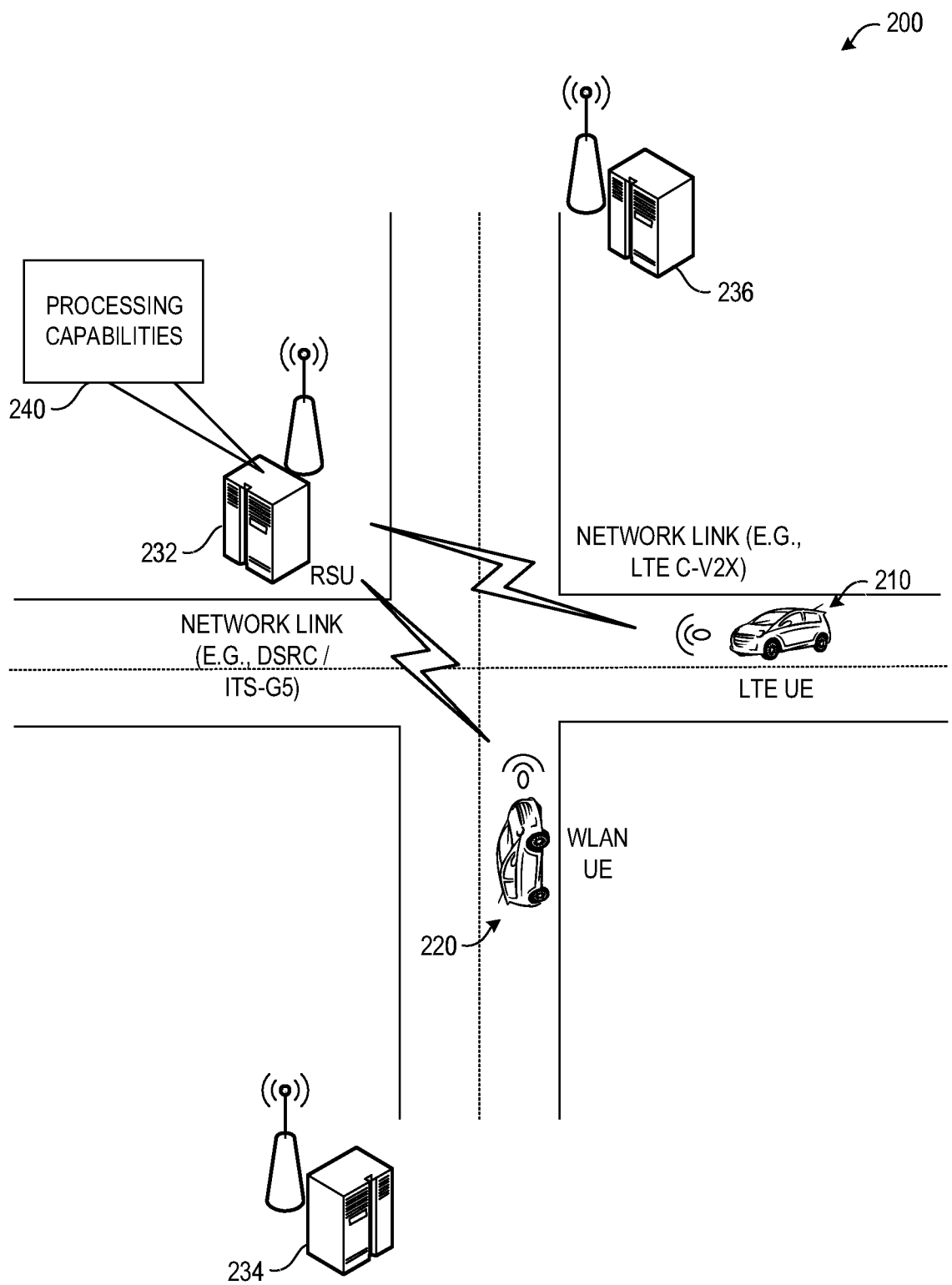
FIG. 2 illustrates an operative arrangement of a network and mobile user equipment, according to an example.

FIG. 2 illustrates an operative arrangement 200 of network and vehicle user equipment, in which various embodiments may be practiced. In arrangement 200, vehicle user equipment (vUE) 210, 220 may operate with a defined communication system (e.g., using a LTE C-V2X WWAN, or a SRC/ETSI ITS-G5 (WLAN) communication network, etc.). In embodiments, a Road Side Unit (RSU) 232 may provide processing services 240 by which the vUEs 210 and 220 may communicate with one another (or to other services), execute services individually and with each other, or access similar aspects of coordinated or device-specific edge computing services. In embodiments, the processing services 240 may be provided by a MEC host (e.g., an ETSI MEC host), MEC platform, or other MEC entity implemented in or by hardware of the RSU 232. In this example, the RSU 232 may be a stationary RSU, such as an eNB-type RSU or other like infrastructure. In other embodiments, the RSU 232 may be a mobile RSU or a UE-type RSU, which may be implemented by a vehicle (e.g., a truck), pedestrian, or some other device with such capabilities. In these cases, mobility issues can be managed in order to ensure a proper radio coverage of the applicable services. For instance, mobility may be managed as the respective vUEs 220, 210 transition from, and to, operation at other RSUs, such as RSUs 234, 236, and other network nodes not shown.

Figure 3:
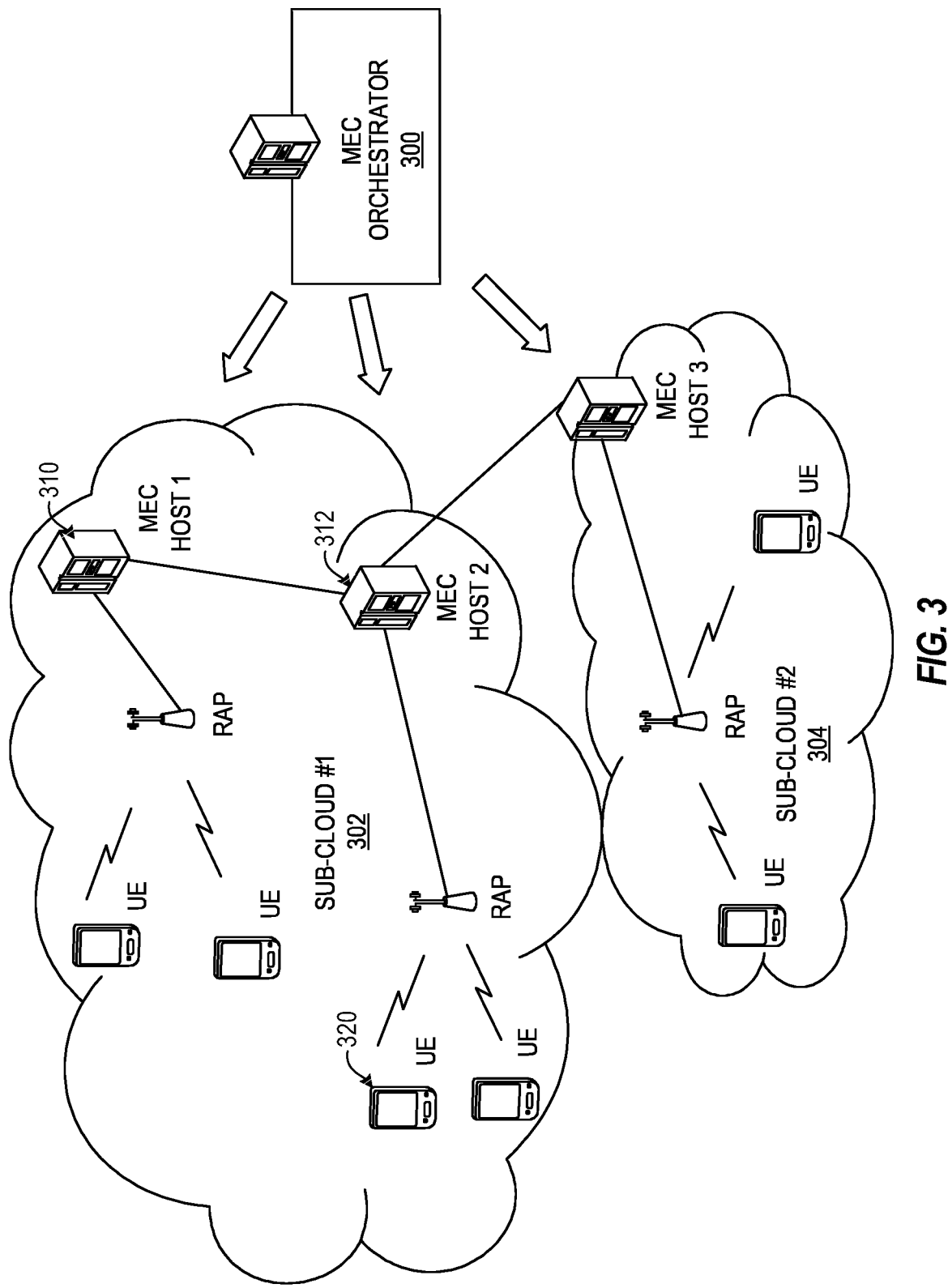
FIG. 3 includes a block diagram of a generalized (and layered) sub-cloud instantiation by MEC orchestrator, according to an example.

FIG. 3 depicts a block diagram of a generalized (and layered) sub-cloud instantiation by a MEC orchestrator 300, according to an example. This diagram illustrates a generalized definition for a distributed computing system, by introducing sub-clouds 302 and 304 (e.g., comparable to "poker tables" in a multiplayer online poker game) on a logical basis. In this example, zones (and sub-clouds) can be defined "logically", based on levels of end-to-end latencies needed to, for example, instantiate a MEC application, or, migrate a service from the service registry of a MEC host 310 of the sub-cloud 302 to another entity of the same sub-cloud (e.g., another MEC host 312). Such zones and sub-clouds are not, however, necessarily determined on "physical" co-location.

In an example, a sub-cloud is defined as including: a set of device applications (e.g., running on respective devices (UEs, e.g., 320)); and, a set of MEC application (running on different MEC hosts, e.g., 310 and 312). This sub-cloud is identified by a proper Multiple Application Context, such as may be incorporated with or added into the ETSI standard GS MEC-016 "Multi-access Edge Computing (MEC); UE application interface".

In various contexts, different RATs (Radio Access Technologies), even non-3GPP networks, can be considered for use within a sub-cloud. For example, user devices may be associated in parallel with different MEC applications (e.g., one connected through cellular network and the other through a Wi-Fi network). The present techniques allow these and other combinations, exploiting radio diversity as a key asset for the convergence of different systems at application layer.

In a further example, task/application offloading may be provided in a multi-node environment. This use case can be enabled with the present configuration for scenarios such as multi-device/multi-user interactions and multi-point AR/VR applications, including but not limited to multi-player games, advanced videoconferencing, NB-IoT sensors, big data management, industrial IoT, and the like.

In an example, a MEC-based enhancement includes the use of proper data structures and procedures able to support the creation, joining, deletion and update of sub-clouds of applications instances (also referred to below, as "Application Multiple Contexts"). The purpose of this enhancement is to address sophisticated and/or computationally demanding requests from a Device Application via the Mx2 reference point in the MEC system to instantiate distributed cloud resources (including software instances/services running across multiple MEC hosts and multiple UEs). These cloud resources can be either replicated or shared, and may identify distinctive capabilities.

To address relevant service consumption requests, the following also defines a protocol that discovers information parts and collects telemetry information from individual nodes which are in hold of these information parts. To flexibly define/replace/update the mentioned sub-clouds, the following includes a publish/subscribe method between the MEC hosts in different locations allowing extension or replacement of the nodes of a sub-cloud, which may be initiated by the MEC hosts for various reasons such as mobility of UE application, service migration, service backup, as well as for load-balancing, energy consumption reduction etc.

Further, the proposed distributed MEC application/service framework enables the expansion of computing hardware to the edge of the network, including not only MEC servers, but also terminals and different types of devices. Additionally, customers (including consumers with low-end UEs but also companies deploying IoT devices and other types of UEs) will be able to more easily delegate tasks in the edge cloud, without the need to overprovision radio/computational/resources in the device itself. This result is often not feasible by design, due to strict requirements in terms of power consumption and/or long battery life constraints (e.g. for NB-IoT or other kind of sensors).

In an example, a sub-cloud can be extended, contracted or replaced according to the environmental situation (e.g. the existence/absence of the need a device/MEC application—the consumer—has to consume services) and/or driven by business needs, as the entities forming the sub-cloud need to be motivated to expose their Apps. For example, more UE apps may join the already setup Multiple Application Context (and thereby, also the sub-cloud) and provide additional Apps to the sub-cloud (e.g. once the apps are in need of consuming services already registered to such apps). Conversely, sub-cloud device apps may withdraw participation, when, for instance, being a contributor of a given sub-cloud is not economically viable or contextually relevant to the locally running apps.

At the same time, mobility of a UE device may require the (source) MEC host to migrate a service to another (target) MEC host transparently to the UE. In this case, it may be possible that the physical entity (UE) on which a device application (i.e. one of the sub-cloud apps) is running has moved to a different physical location (e.g. under the radio coverage of a Radio Access Point (RAP) co-located with the (target) MEC host); however, the device application continues to be a part of the same sub-cloud. This may occur, for instance, in the case where this specific device application exposes a service vital for the execution of another application contributing to the same sub-cloud.

As a result, a mechanism to transparently manage the sub-clouds or the Multiple Application Context may be used between the MEC hosts of a given MEC system (or, of different MEC systems), taking into account multiple criteria relevant to the performance requirements of the service consumers (e.g. end-to-end latency). In an example, this mechanism may be provided through a publish/subscribe method or protocol between the MEC hosts to perform these actions transparent to the UE apps.

In an example, a new data structure, called AppMultipleContext, is used to identify a sub-cloud and related application instances. With use of this data structure, the device application may request (through Mx2 interface) to: instantiate (create) such an Application Multiple Context, or simply join to an existing Application Multiple Context; or again delete or update an Application Multiple Context. This proposed new set of procedures is enhancing the Mx2 interface between the device application and the user application LCM proxy.

According to the current ETSI MEC standard implementations, an Application Context is already foreseen, and when existing, this context includes a MEC Application instance and one or more Device Apps (running on UEs) associated with the context. Current implementations, however, do not explicitly define if/whether these UE instances can communicate with each other, nor is possible to create a Multiple Application Context with many MEC apps (running potentially also on different MEC hosts). As a result, the following procedures and data flows introduce operations for the management of Application Multiple Contexts, and a proper data structure to support these procedures.

Figure 4:
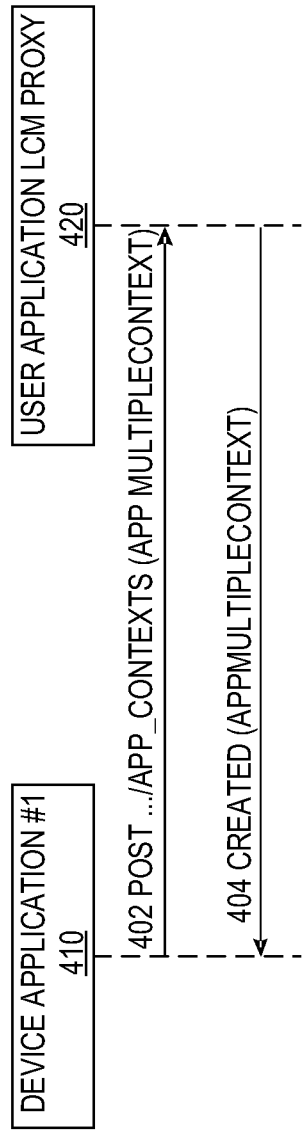
FIG. 4 illustrates an application multiple context create procedure, according to an example.

FIG. 4 provides an illustration of an application multiple context create procedure, according to an example. The application multiple context create provides a procedure to request either to join with an available user application, or to instantiate a new user application.

As shown at 402, with this procedure, the device application 410 submits a request, such as a POST request, to the user application lifecycle management (LCM) proxy 420. The message body contains the data structure for the application multiple context to be created. The user application lifecycle management proxy 420 authorizes the request from the device application 410. The request may be forwarded to the Operations Support System (OSS). The OSS may make the decision on granting the multiple context creation request. The multi-access edge orchestrator triggers the creation of the application multiple context in the MEC system.

As shown at 404, the user application lifecycle management proxy returns a "201 Created" response to the Device application with the message body containing the data structure of the created application multiple context.

Figure 5:
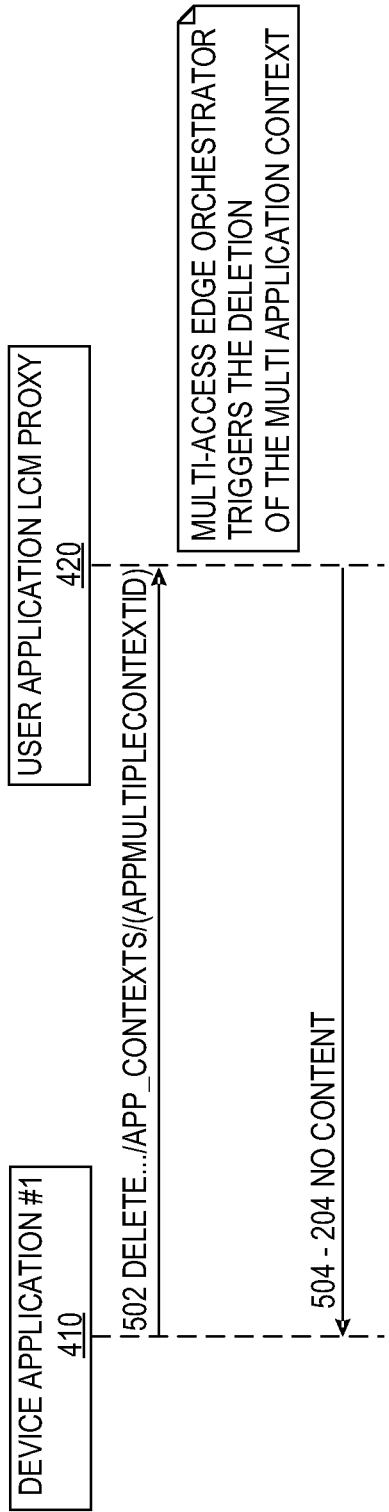
FIG. 5 illustrates an application multiple context delete procedure, according to an example.

FIG. 5 provides an illustration of an application multiple context delete procedure, according to an example. The application multiple context delete provides a procedure in which the UE application requests the deletion of the application multiple context.

As shown 502, the UE application 410 submits a DELETE request to the user application lifecycle management (LCM) proxy 420 for the resource to be deleted. The user application lifecycle management proxy 420 authorizes the request from the UE application. The request may be forwarded to the OSS. The OSS may make the decision on granting the deletion. The multi-access edge orchestrator triggers the deletion of the application multiple context.

As shown at 504, the user application lifecycle management proxy returns a "204 No content" response.

Figure 6:
FIG. 6 illustrates an application multiple context update, according to an example.

FIG. 6 provides an illustration of an application multiple context update, according to an example. The application multiple context update provides a procedure in which the user application lifecycle management proxy 420 receives an update of the ueAppMultipleContext.

As shown at 602, the UE application 410 updates the ueAppMultipleContext. The request includes the MultipleContextId with the modified data structure of MultipleAppContext where only the callback reference is allowed to be updated by the UE application. In some examples, the AppMultipleContext structure may be protected using process and hardware isolation techniques such as containers, OS processes, virtual machine, SGX, FPGA, virtual memory, hardware partitioning. User Agents may be isolated from other tenants of the MEC system using above techniques. Access to appMultipleContext may be subject to multi-tenant isolation and access control mechanisms common to MEC.

As shown at 604, the user application lifecycle management proxy 420 returns a "204 No Content" response.

Figure 7:
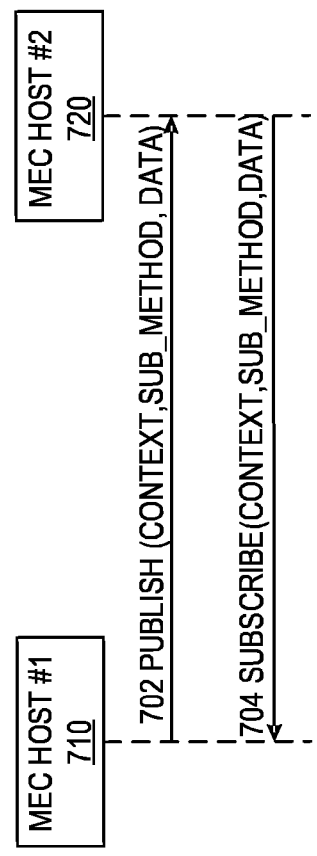
FIG. 7 illustrates an inter MEC host publish/subscribe procedure, for an application multiple context, according to an example.

FIG. 7 provides an illustration of an inter MEC host 710 publish/subscribe procedure, for an application multiple context procedure, according to an example. The inter MEC host 710 publish/subscribe provides a procedure that permits MEC hosts, such as MEC host 720, to communicate between each other in the context of the Application Multiple Context. There may be various scenarios where a MEC host, which is currently hosting a sub-cloud, has to perform a publish/subscribe type of communication with other MEC hosts. Some examples are given below:

1) A UE which is a part of the sub-cloud/Application Multiple Context is mobile. The MEC host identifying this may need to transfer that service to another MEC host.

2) The MEC host may need to start backup MEC application or supplementary apps needed to support the Application Multiple Context.

3) A participating MEC host may require more resources (such as storage) to be used from adjacent low-latency MEC hosts.

4) A new UE and MEC application that has joined a sub-cloud may be provided with context data (such as configuration files, best practices etc.).

In contrast to the protocols depicted in FIGS. 4-6, the protocol depicted in FIG. 7 does not exclusively refer to a specific action but includes the actions taken between the MEC hosts to support the Application Multiple Context. Therefore, this publish/subscribe method may include any of the above exemplified actions (create, update, delete) as sub-methods.

In a further example, a data structure, referred to as "AppMultipleContext", may be introduced to support the above described procedures. This data structure type may represent the information on application multiple context created by the MEC system, based on the following properties:

TABLE 1

| Attribute name | Data type | Cardinality | Description |
| --- | --- | --- | --- |
| ContextId | String | 1 | Uniquely identifies the application multiple context in the MEC system. Assigned by the MEC system and included in the response. The length of the value shall not exceed 32 characters. |
| app_ins_id | String | 0 . . . 1 | Comma separated list of application instance identifiers, related to all MEC applications in the Application Multiple Context |
| associateUeAppId | String | 1 | Uniquely identifies the UE application. Included in the request. The length of the value shall not exceed 32 characters. |
| callbackReference | URI | 0 . . . 1 | URI assigned by the UE application to receive application lifecycle related notifications. Included in the request. This subscription stays alive for the lifetime of the application context. |
| appInfo | Structure (inlined) | 1 | Included in the request. As defined below. |
| >appName | String | 1 | Name of the MEC application. The length of the value shall not exceed 32 characters. |
| >appProvider | String | 1 | Provider of the MEC application. The length of the value shall not exceed 32 characters. |
| >appSoftVersion | String | 0 . . . 1 | Software version of the MEC application. The length of the value shall not exceed 32 characters. |
| >appDescription | String | 0 . . . 1 | Human readable description of the MEC application. The length of the value shall not exceed 128 characters. |
| >referenceURI | URI | 1 | Address of the user application. Used as the reference URI for the application. Assigned by the MEC system and included in the response. |
| >appPackageSource | URI | 0 . . . 1 | URI of the application package. Included in the request if the application is not one in the ApplicationList. appPackageSource enables on-boarding of the application package into the MEC system. |

TABLE 1-continued

| Attribute name | Data type | Cardinality | Description |
| --- | --- | --- | --- |
| | | | The application package shall comply with the definitions in clause 6.2.1.2 of ETSI GS MEC 010-2 |

NOTE 1:
If a value of the attribute is included in the request, the same value shall be included in the response.
NOTE 2:
The design of the current operation with callback reference assumes no web proxy between the entity that originates the notification and the entity that receives it.
NOTE 3:
The language support for the application description may be limited.

Figure 8:
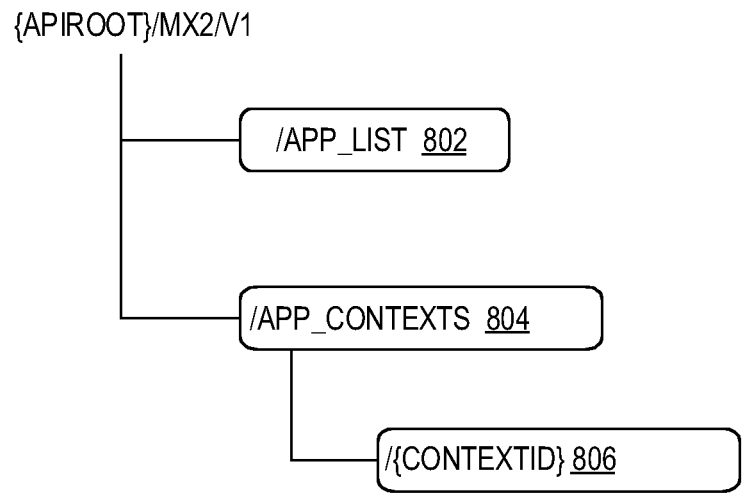
FIG. 8 illustrates an example resource URI structure for the ETSI MEC Mx2 API, according to an example.

In a further example, a Resource URI Structure of the Mx2 API may be defined to allow use of the preceding attributes and resources. FIG. 8 depicts an example resource URI structure for the ETSI MEC Mx2 API, according to an example. As will be apparent, the current resource URI structure of the UE application interface API (e.g., as specified by the ETSI GS MEC 016), may be utilized, but with enhanced content for different attributes and resources.

In an example, the following resources and methods may be modified for use with the resource URI:

TABLE 2

| Resource name | Resource URI | HTTP method | Meaning |
| --- | --- | --- | --- |
| meAppList | /app_list 802 | GET | Retrieve current available application information. |
| Parent resource of all ueAppMultipleContexts | /app_contexts 804 | POST | Create a new ueAppMultipleContext resource. |
| Individual ueAppMultipleContext | /app_contexts/{ContextId} 806 | PUT | Update the callbackReference of the existing ueAppMultipleContext resource. |
| | | DELETE | Delete an existing ueAppMultipleContext resource. |

Other variations to the preceding procedures and interfaces will be apparent from the examples above.

Figure 9:
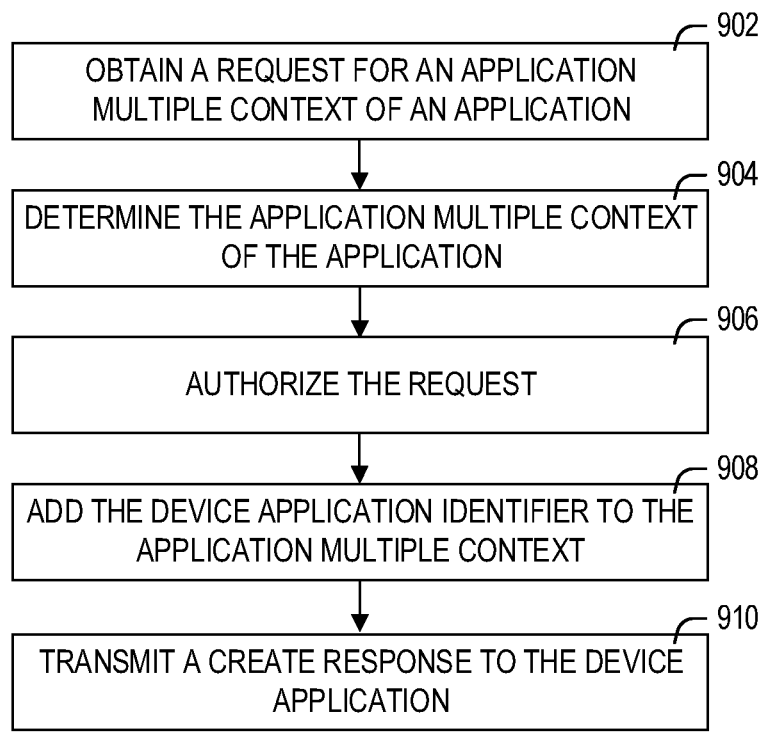
FIG. 9 illustrates a flowchart of a lifecycle management (LCM) proxy, according to an example.

FIG. 9 illustrates a flowchart of a lifecycle management (LCM) proxy, according to an example. At 902, a request is obtained, from a device application, for an application multiple context of an application. At 904, the application multiple context for the application is determined. In an example, the application multiple context does not exist prior to the request and the application multiple context is created. The application multiple context may include a reference to the application and to the device application. In other examples, an application multiple context for the application already exists prior to the request. In these examples, the LCM proxy may determine an existing application multiple context for the application exists. The identifier may be used to identify the existing application multiple context for the application.

At 906, the LCM proxy may authorize the request from the device application for the application multiple context for the application. At 908, a device application identifier based on the request is added to the application multiple context. At 910, the LCM proxy transmits, to the device application, a created response for the device application based on the authorization of the request, wherein the response includes an identifier of the application multiple context.

In other examples, the LCM proxy obtains a request, from the device application, to delete the application multiple context of the application. The request to delete the application multiple context from the device application for the application multiple context for the application may be authorized by the LCM proxy. A request may be transmitted to a multi-access edge computing (MEC) orchestrator from the LCM proxy, to delete the application multiple context for the device. A deleted response may be sent to the device application based on the authorization of the request. The response may include an identifier of the application multiple context.

In another example, the LCM proxy may obtain a request, from the device application, to update the application multiple context of the application. The request may include a multiple context identifier and modified data. The application multiple context of the application is determined based on the multiple context identifier. The application multiple context is updated based on the modified data. The LCM proxy may then transmit, to the device application, an updated response for the device application based on the authorization of the request. The response may include an identifier of the application multiple context. In some examples, the modified data may include an updated call back reference.

In another example, the LCM proxy may obtain a publish message from a MEC host. The publish message may include the application multiple context of the application. The application multiple context of the application may then be transferred to the MEC host.

As noted in the discussion above, the techniques discussed herein may be applicable to use with MEC and like Fog architectures, including those defined by ETSI MEC specifications and like standards bodies. MEC technology permits flexible and rapid deployments of innovative applications and services towards mobile subscribers, enterprises, or vertical segments. For example, regarding the automotive sector, applications such as V2X (e.g., IEEE 802.11p, or 3GPP LTE C-V2X) exchange data, provide data to aggregation points, or access data in databases, to ascertain an overview of the local situation derived from a multitude of sensors (e.g., by various cars, roadside units, etc.). As will be appreciated, the presently described validation architecture and reputation service are suited for integration within uses of a MEC or Fog-based system or facility, implemented with hardware and software resources.

Figure 10:
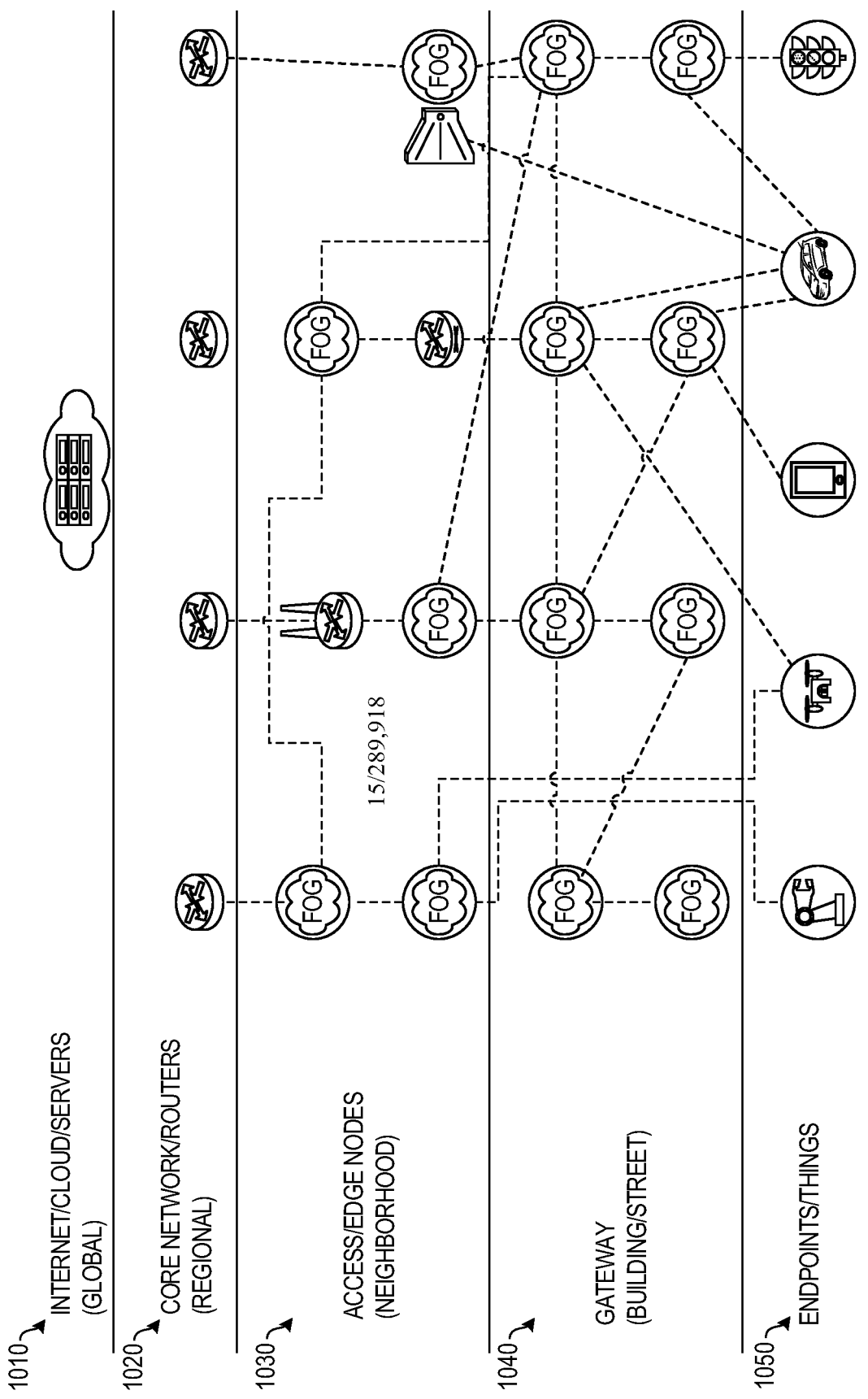
FIG. 10 illustrates a MEC and Fog network topology, according to an example.

FIG. 10 illustrates a MEC and Fog network topology, according to an example. This network topology, which includes a number of conventional networking layers, may be extended through use of the tags and objects discussed herein. Specifically, the relationships between endpoints (at endpoints/things network layer 1050), gateways (at gateway layer 1040), access or edge computing nodes (e.g., at neighborhood nodes layer 1030), core network or routers (e.g., at regional or central office layer 1020), may be represented through the use of linked objects and tag properties.

A Fog network (e.g., established at gateway layer 1040) may represent a dense geographical distribution of near-user edge devices (e.g., Fog nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 10 illustrates a general architecture that integrates a number of MEC and FOG nodes—categorized in different layers (based on their position, connectivity and processing capabilities, etc.). It will be understood, however, that such Fog nodes may be replaced or augmented by edge computing processing nodes.

Fog nodes may be categorized depending on the topology and the layer where they are located. In contrast, from a MEC standard perspective, each Fog node may be considered as a mobile edge (ME) Host, or a simple entity hosting a ME application and a light-weighted ME Platform. In an example, a MEC or Fog node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional client, V2V, and other network applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in the applicable communications context, a hierarchical structure of data processing and storage nodes may be defined. For example, including local ultra-low-latency processing, regional storage and processing as well as remote cloud data-center based storage and processing. SLAs, and KPIs, and other measures discussed herein may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 11:
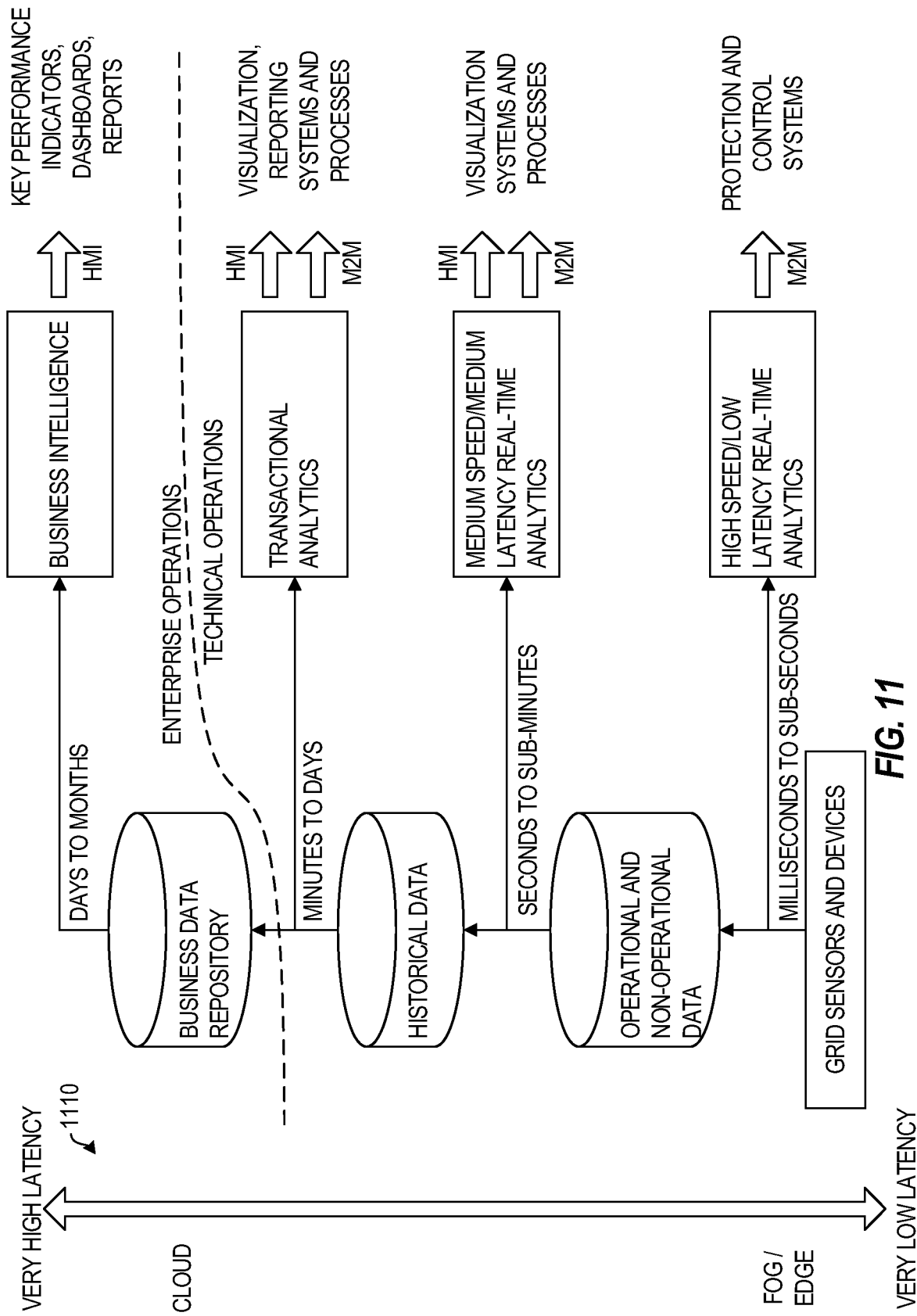
FIG. 11 illustrates processing and storage layers in a MEC and Fog network, according to an example.

FIG. 11 illustrates processing and storage layers in a MEC and Fog network, according to an example. The illustrated data storage or processing hierarchy 1110 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 12:
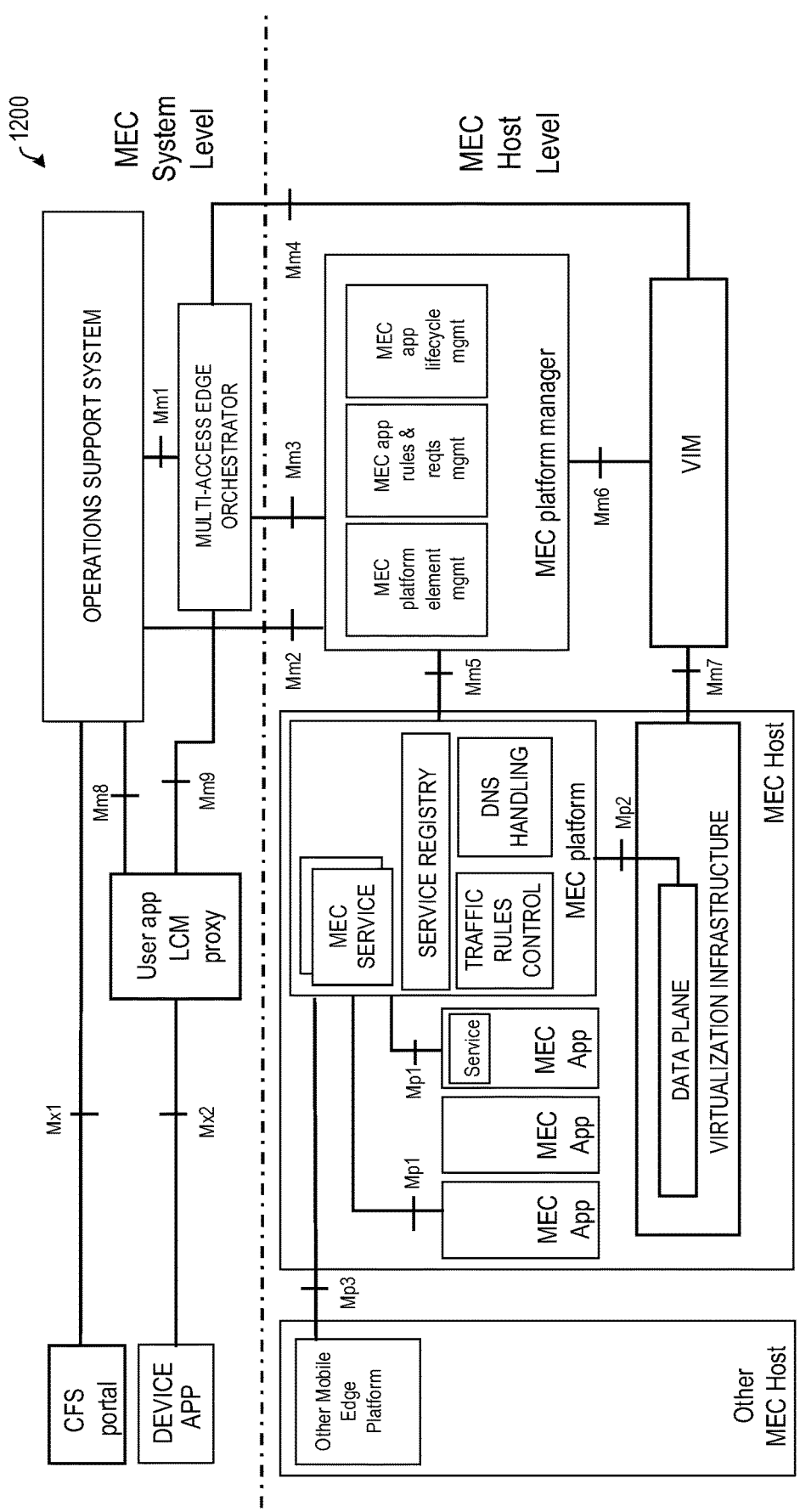
FIG. 12 illustrates a block diagram for a MEC system architecture, according to an example.

FIG. 12 depicts a block diagram for an example MEC system architecture in which any one or more of the techniques (e.g., operations, processes, methods, and methodologies) discussed herein may be performed. In an example, the MEC system architecture may be defined according to a specification, standard, or other definition (e.g., according to the ETSI GS MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 12, and the communications to perform network operations may be implemented at any number of the interfaces of the MEC system architecture depicted in FIG. 12.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

In further examples, the preceding examples of network communications and operations (e.g., with edge device deployments) may be integrated with IoT and like device-based network architectures. FIG. 17 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

MEC and other Edge computing use cases have been envisioned to integrate into a number of network and application settings, including those to support network arrangements of IoT deployments. IoT devices are physical or virtualized objects that may communicate on a network (typically at the edge or endpoint of a network), and may include sensors, actuators, and other input/output components, such as to collect data or perform actions from a real world environment. For example, IoT devices may include low-powered devices that are embedded or attached to everyday things, such as buildings, vehicles, packages, etc., to provide sensor, data, or processing functionality. Recently, IoT devices have become more popular and thus applications and use cases using these devices have proliferated.

Various standards have been proposed to more effectively interconnect and operate IoT devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on QoS terms specified in SLA and service delivery agreements. As will be understood, the use of IoT devices and networks present a number of new challenges in a heterogeneous network of connectivity comprising a combination of wired and wireless technologies.

Figure 13:
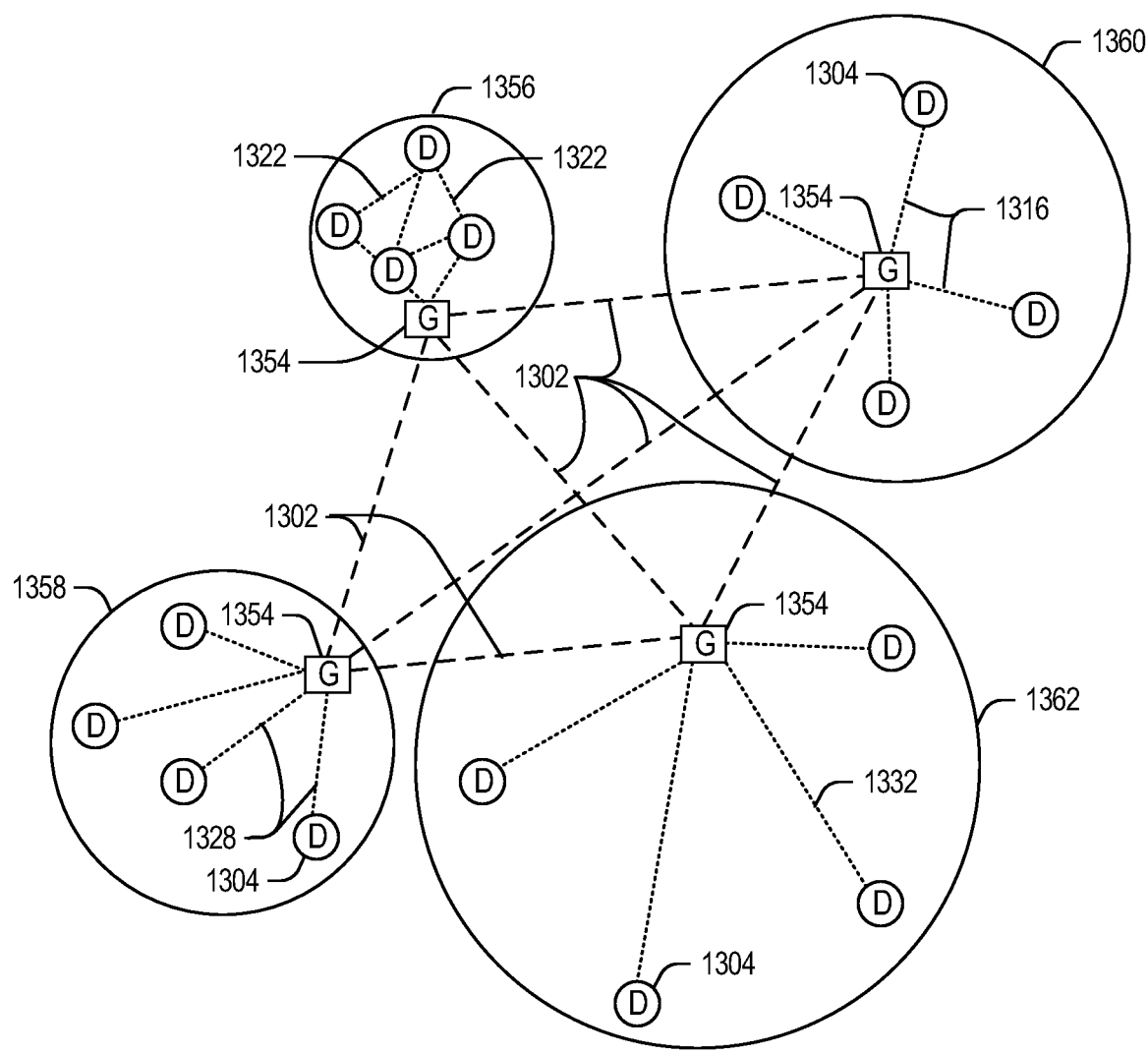
FIG. 13 illustrates a domain topology for respective device networks (e.g., internet-of-things (IoT) device networks) coupled through links to respective gateways, according to an example.

FIG. 13 specifically provides a simplified drawing of a domain topology that may be used for a number of IoT networks comprising IoT devices 1304, with the IoT networks 1356, 1358, 1360, 1362, coupled through backbone links 1302 to respective gateways 1354. For example, a number of IoT devices 1304 may communicate with a gateway 1354, and with each other through the gateway 1354. To simplify the drawing, not every IoT device 1304, or communications link (e.g., link 1316, 1322, 1328, or 1332) is labeled. The backbone links 1302 may include any number of wired or wireless technologies, including optical networks, and may be part of a local area network (LAN), a wide area network (WAN), or the Internet. Additionally, such communication links facilitate optical signal paths among both IoT devices 1304 and gateways 1354, including the use of MUXing/deMUXing components that facilitate interconnection of the various devices.

The network topology may include any number of types of IoT networks, such as a mesh network provided with the network 1356 using Bluetooth low energy (BLE) links 1322. Other types of IoT networks that may be present include a wireless local area network (WLAN) network 1358 used to communicate with IoT devices 1304 through IEEE 802.11 (Wi-Fi®) links 1328, a cellular network 1360 used to communicate with IoT devices 1304 through an LTE/LTE-A (4G) or 5G cellular network, and a low-power wide area (LPWA) network 1362, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1304, such as over the backbone links 1302, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1356, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1358, for instance, may use systems that perform standards conversion to provide multi-standard connectivity, enabling IoT devices 1304 using different protocols to communicate. Further systems may provide seamless interconnectivity across a multi-standard infrastructure comprising visible Internet resources and hidden Internet resources.

Communications in the cellular network 1360, for instance, may be enhanced by systems that offload data, extend communications to more remote devices, or both. The LPWA network 1362 may include systems that perform non-Internet protocol (IP) to IP interconnections, addressing, and routing. Further, each of the IoT devices 1304 may include the appropriate transceiver for wide area communications with that device. Further, each IoT device 1304 may include other transceivers for communications using additional protocols and frequencies. This is discussed further with respect to the communication environment and hardware of an IoT processing device depicted in FIGS. 12 and 15.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 14 below.

Figure 14:
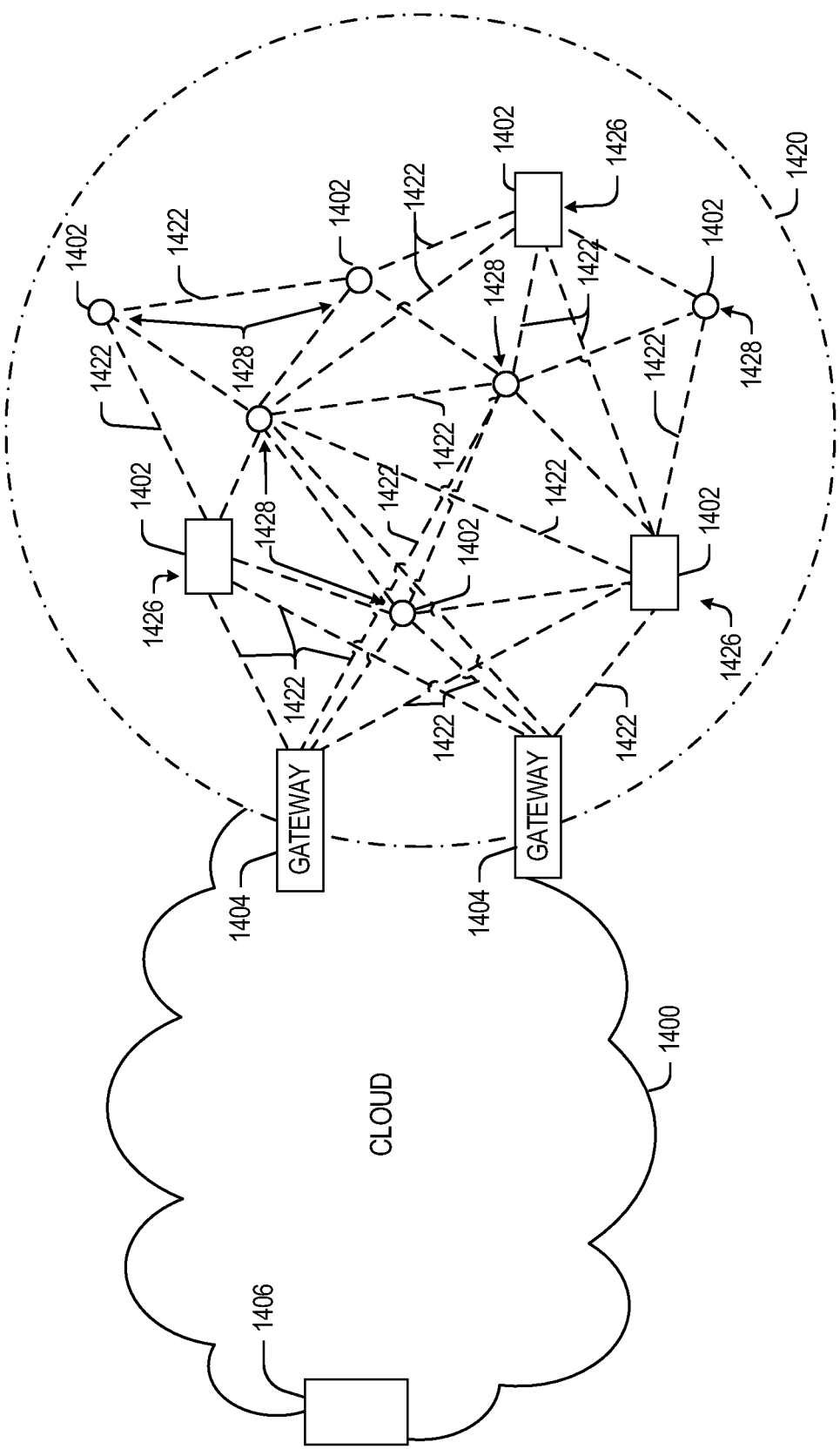
FIG. 14 illustrates a cloud-computing network in communication with a mesh network of IoT/endpoint devices operating as a Fog device at the edge of the cloud-computing network, according to an example.

FIG. 14 illustrates a cloud computing network in communication with a mesh network of IoT devices (devices 1402) operating as a fog platform in a networked scenario. The mesh network of IoT devices may be termed a fog network 1420, established from a network of devices operating at the edge of the cloud 1400. To simplify the diagram, not every IoT device 1402 is labeled.

The fog network 1420 may be considered to be a massively interconnected network wherein a number of IoT devices 1402 are in communications with each other, for example, by radio links 1422. The fog network 1420 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1420 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1402 are shown in this example, gateways 1404, data aggregators 1426, and sensors 1428, although any combinations of IoT devices 1402 and functionality may be used. The gateways 1404 may be edge devices that provide communications between the cloud 1400 and the fog 1420, and may also provide the backend process function for data obtained from sensors 1428, such as motion data, flow data, temperature data, and the like. The data aggregators 1426 may collect data from any number of the sensors 1428, and perform the back end processing function for the analysis. The results, raw data, or both may be passed along to the cloud 1400 through the gateways 1404. The sensors 1428 may be full IoT devices 1402, for example, capable of both collecting data and processing the data. In some cases, the sensors 1428 may be more limited in functionality, for example, collecting the data and enabling the data aggregators 1426 or gateways 1404 to process the data.

Communications from any IoT device 1402 may be passed along a convenient path (e.g., a most convenient path) between any of the IoT devices 1402 to reach the gateways 1404. In these networks, the number of interconnections provide substantial redundancy, enabling communications to be maintained, even with the loss of a number of IoT devices 1402. Further, the use of a mesh network may enable IoT devices 1402 that are very low power or located at a distance from infrastructure to be used, as the range to connect to another IoT device 1402 may be much less than the range to connect to the gateways 1404.

The fog 1420 provided from these IoT devices 1402 may be presented to devices in the cloud 1400, such as a server 1406, as a single device located at the edge of the cloud 1400, e.g., a fog device. In this example, the alerts coming from the fog device may be sent without being identified as coming from a specific IoT device 1402 within the fog 1420. In this fashion, the fog 1420 may be considered a distributed platform that provides computing and storage resources to perform processing or data-intensive tasks such as data analytics, data aggregation, and machine-learning, among others.

In some examples, the IoT devices 1402 may be configured using an imperative programming style, e.g., with each IoT device 1402 having a specific function and communication partners. However, the IoT devices 1402 forming the fog device may be configured in a declarative programming style, enabling the IoT devices 1402 to reconfigure their operations and communications, such as to determine needed resources in response to conditions, queries, and device failures. As an example, a query from a user located at a server 1406 about the operations of a subset of equipment monitored by the IoT devices 1402 may result in the fog 1420 device selecting the IoT devices 1402, such as particular sensors 1428, needed to answer the query. The data from these sensors 1428 may then be aggregated and analyzed by any combination of the sensors 1428, data aggregators 1426, or gateways 1404, before being sent on by the fog 1420 device to the server 1406 to answer the query. In this example, IoT devices 1402 in the fog 1420 may select the sensors 1428 used based on the query, such as adding data from flow sensors or temperature sensors. Further, if some of the IoT devices 1402 are not operational, other IoT devices 1402 in the fog 1420 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 15:
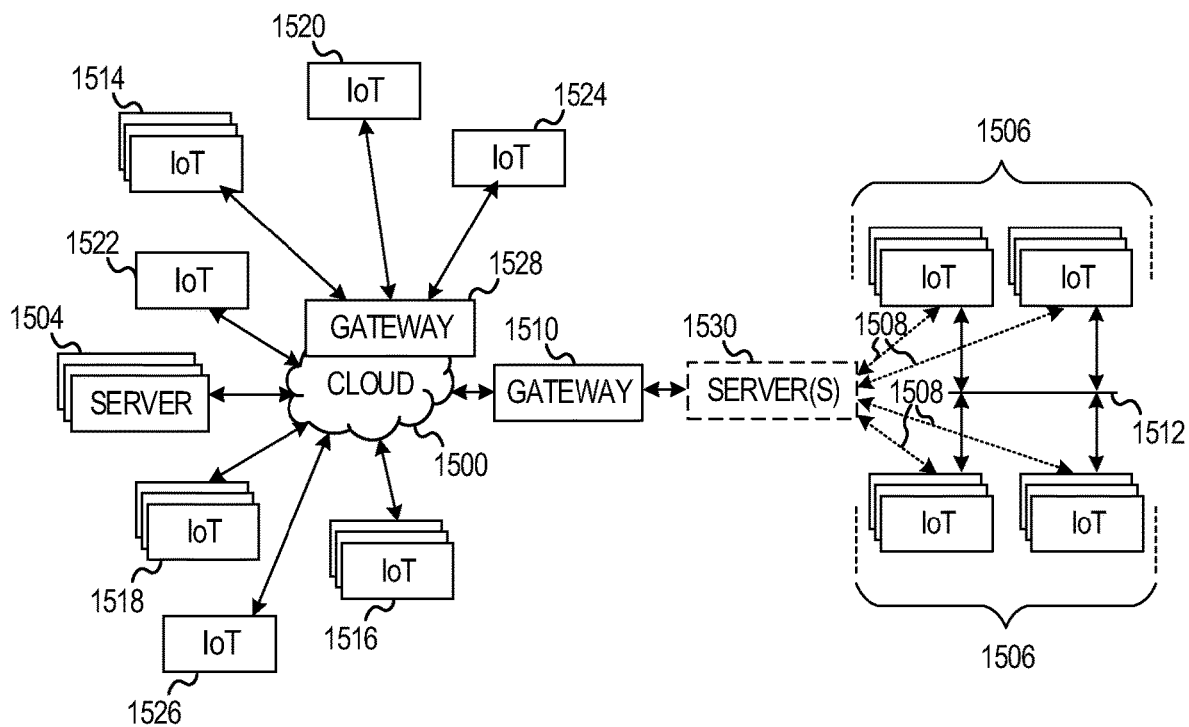
FIG. 15 illustrates a block diagram of a network illustrating communications among a number of IoT/endpoint devices, according to an example.

FIG. 15 illustrates a drawing of a cloud computing network, or cloud 1500, in communication with a number of IoT devices. The cloud 1500 may represent the Internet, or may be a local area network (LAN), or a wide area network (WAN), such as a proprietary network for a company. The IoT devices may include any number of different types of devices, grouped in various combinations. For example, a traffic control group 1506 may include IoT devices along streets in a city. These IoT devices may include stoplights, traffic flow monitors, cameras, weather sensors, and the like. The traffic control group 1506, or other subgroups, may be in communication with the cloud 1500 through wired or wireless links 1508, such as LPWA links, optical links, and the like. Further, a wired or wireless sub-network 1512 may allow the IoT devices to communicate with each other, such as through a local area network, a wireless local area network, and the like. The IoT devices may use another device, such as a gateway 1510 or 1528 to communicate with remote locations such as the cloud 1500; the IoT devices may also use one or more servers 1530 to facilitate communication with the cloud 1500 or with the gateway 1510. For example, the one or more servers 1530 may operate as an intermediate network node to support a local edge cloud or fog implementation among a local area network. Further, the gateway 1528 that is depicted may operate in a cloud-to-gateway-to-many edge devices configuration, such as with the various IoT devices 15, 1520, 1524 being constrained or dynamic to an assignment and use of resources in the cloud 1500.

Other example groups of IoT devices may include remote weather stations 1514, local information terminals 1516, alarm systems 1518, automated teller machines 1520, alarm panels 1522, or moving vehicles, such as emergency vehicles 1524 or other vehicles 1526, among many others. Each of these IoT devices may be in communication with other IoT devices, with servers 1504, with another IoT fog platform or system, or a combination therein. The groups of IoT devices may be deployed in various residential, commercial, and industrial settings (including in both private or public environments).

As may be seen from FIG. 15, a large number of IoT devices may be communicating through the cloud 1500. This may allow different IoT devices to request or provide information to other devices autonomously. For example, a group of IoT devices (e.g., the traffic control group 1506) may request a current weather forecast from a group of remote weather stations 1515, which may provide the forecast without human intervention. Further, an emergency vehicle 1524 may be alerted by an automated teller machine 1520 that a burglary is in progress. As the emergency vehicle 1524 proceeds towards the automated teller machine 1520, it may access the traffic control group 1506 to request clearance to the location, for example, by lights turning red to block cross traffic at an intersection in sufficient time for the emergency vehicle 1524 to have unimpeded access to the intersection.

Clusters of IoT devices, such as the remote weather stations 1515 or the traffic control group 1506, may be equipped to communicate with other IoT devices as well as with the cloud 1500. This may allow the IoT devices to form an ad-hoc network between the devices, allowing them to function as a single device, which may be termed a fog platform or system (e.g., as described above with reference to FIG. 14).

Figure 16:
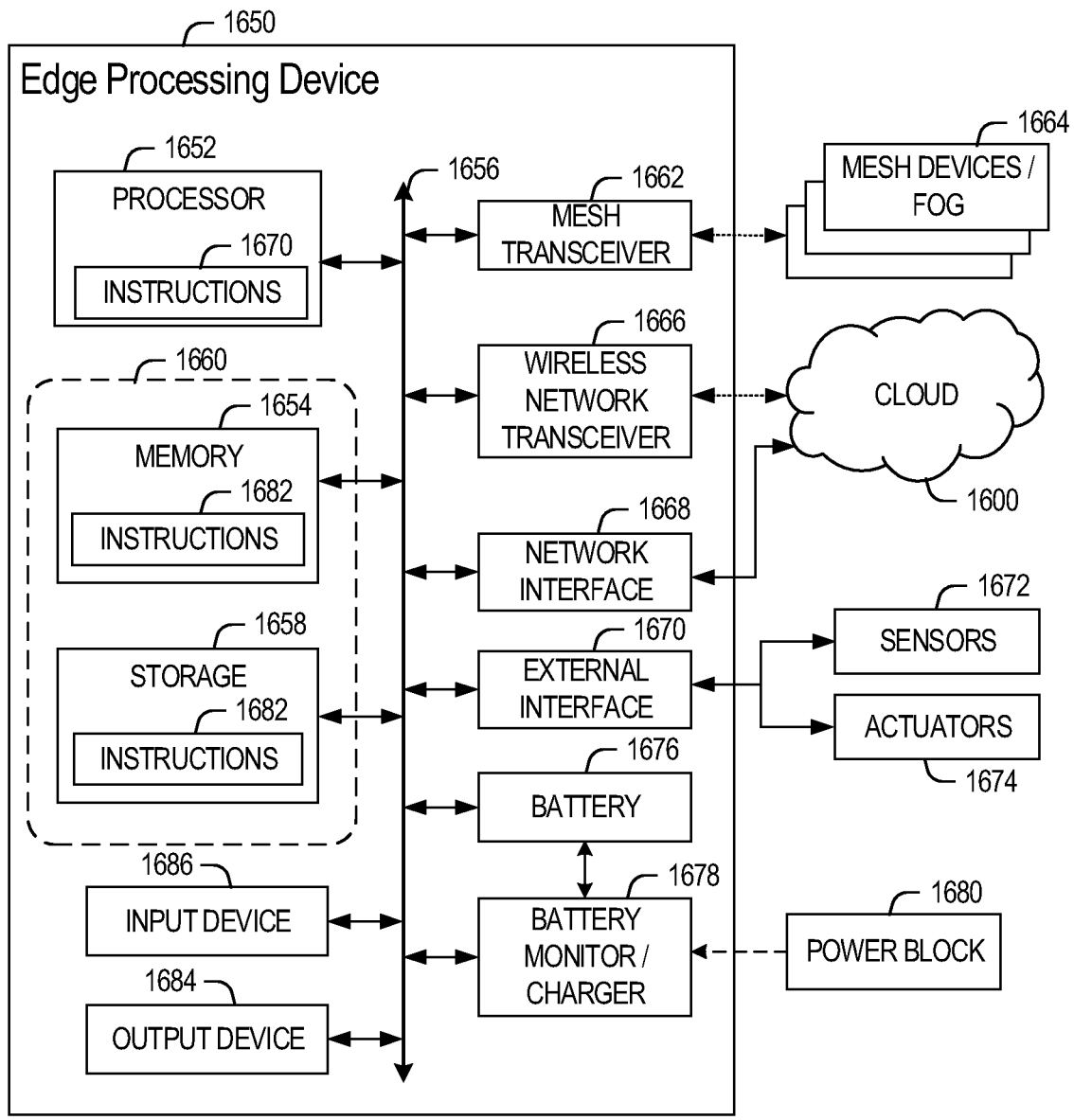
FIG. 16 illustrates a block diagram for an example device architecture upon which any one or more of the techniques (e.g., operations, processes, methods, and methodologies) discussed herein may be performed, according to an example.

FIG. 16 is a block diagram of an example of components that may be present in an edge processing device 1650 (e.g., a computer, IoT device, edge server, etc.) for implementing any of the techniques described herein. The device 1650 may include any combinations of the components shown in the example or referenced in the disclosure above. The components may be implemented as ICs, portions thereof, discrete electronic devices, or other modules, logic, hardware, software, firmware, or a combination thereof adapted in the device 1650, or as components otherwise incorporated within a chassis of a larger system. Additionally, the block diagram of FIG. 16 is intended to depict a high-level view of components of the device 1650. However, some of the components shown may be omitted, additional components may be present, and different arrangement of the components shown may occur in other implementations.

The device 1650 may include processing circuitry in the form of a processor 1652, which may be a microprocessor, a multi-core processor, a multithreaded processor, an ultra-low voltage processor, an embedded processor, or other known processing elements. The processor 1652 may be a part of a system on a chip (SoC) in which the processor 1652 and other components are formed into a single integrated circuit, or a single package, such as the Edison™ or Galileo™ SoC boards from Intel. As an example, the processor 1652 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1652 may communicate with a system memory 1654 over an interconnect 1656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the interconnect 1656. In an example the storage 1658 may be implemented via a solid state disk drive (SSDD). Other devices that may be used for the storage 1658 include flash memory cards, such as SD cards, microSD cards, xD picture cards, and the like, and USB flash drives. In low power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The components may communicate over the interconnect 1656. The interconnect 1656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1656 may be a proprietary bus, for example, used in a SoC based system. Other bus systems may be included, such as an I2C interface, an SPI interface, point to point interfaces, and a power bus, among others.

The interconnect 1656 may couple the processor 1652 to a mesh transceiver 1662, for communications with other mesh devices 1664. The mesh transceiver 1662 may use any number of frequencies and protocols, such as 2.4 Gigahertz (GHz) transmissions under the IEEE 802.16.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1664. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1662 may communicate using multiple standards or radios for communications at different range. For example, the device 1650 may communicate with close devices, e.g., within about 10 meters, using a local transceiver based on BLE, or another low power radio, to save power. More distant mesh devices 1664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1666 may be included to communicate with devices or services in the cloud 1600 via local or wide area network protocols. The wireless network transceiver 1666 may be a LPWA transceiver that follows the IEEE 802.15.4, or IEEE 802.15.4g standards, among others. The device 1650 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 1662 and wireless network transceiver 1666, as described herein. For example, the radio transceivers 1662 and 1666 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1662 and 1666 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1666, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1668 may be included to provide a wired communication to the cloud 1600 or to other devices, such as the mesh devices 1664. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to enable connect to a second network, for example, a NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1662, 1666, 1668, or 1670. Accordingly, in various examples, applicable means for communicating (e.g., receiving, transmitting, etc.) may be embodied by such communications circuitry.

The interconnect 1656 may couple the processor 1652 to an external interface 1670 that is used to connect external devices or subsystems. The external devices may include sensors 1672, such as accelerometers, level sensors, flow sensors, optical light sensors, camera sensors, temperature sensors, a global positioning system (GPS) sensors, pressure sensors, barometric pressure sensors, and the like. The external interface 1670 further may be used to connect the device 1650 to actuators 1674, such as power switches, valve actuators, an audible sound generator, a visual warning device, and the like.

In some optional examples, various input/output (I/O) devices may be present within, or connected to, the device 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 1650.

A battery 1676 may power the device 1650, although in examples in which the device 1650 is mounted in a fixed location, it may have a power supply coupled to an electrical grid. The battery 1676 may be a lithium ion battery, or a metal-air battery, such as a zinc-air battery, an aluminum-air battery, a lithium-air battery, and the like.

A battery monitor/charger 1678 may be included in the device 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1678 may communicate the information on the battery 1676 to the processor 1652 over the interconnect 1656. The battery monitor/charger 1678 may also include an analog-to-digital (ADC) convertor that enables the processor 1652 to directly monitor the voltage of the battery 1676 or the current flow from the battery 1676. The battery parameters may be used to determine actions that the device 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the device 1650. A wireless battery charging circuit, such as an LTC4020 chip from Linear Technologies of Milpitas, Calif., among others, may be included in the battery monitor/charger 1678. The specific charging circuits chosen depend on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application specific integrated circuit (ASIC).

In an example, the instructions 1682 provided via the memory 1654, the storage 1658, or the processor 1652 may be embodied as a non-transitory, machine readable medium 1660 including code to direct the processor 1652 to perform electronic operations in the device 1650. The processor 1652 may access the non-transitory, machine readable medium 1660 over the interconnect 1656. For instance, the non-transitory, machine readable medium 1660 may be embodied by devices described for the storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a lifecycle management (LCM) proxy apparatus, comprising: processing circuitry; and a memory device including instructions embodied thereon, wherein the instructions, which when executed by the processing circuitry, configure the processing circuitry to perform operations to: obtain a request, from a device application, for an application multiple context of an application; determine the application multiple context for the application; authorize the request from the device application for the application multiple context for the application; add a device application identifier based on the request to the application multiple context; and transmit, to the device application, a created response for the device application based on the authorization of the request, wherein the response includes, an identifier of the application multiple context.

In Example 2, the subject matter of Example 1 includes, wherein to determine the application multiple context for the application the processing circuitry is configured to perform operations to create the application multiple context of the application, wherein the application multiple context comprises a reference to the application and to the device application.

In Example 3, the subject matter of Examples 1-2 includes, wherein to determine the application multiple context for the application the processing circuitry is configured to perform operations to determine an existing application multiple context for the application exists, wherein the identifier identifies the existing application multiple context for the application.

In Example 4, the subject matter of Examples 1-3 includes, wherein the processing circuitry is further configured to perform operations to: obtain a request, from the device application, to delete the application multiple context of the application; authorize the request to delete the application multiple context from the device application for the application multiple context for the application; transmit a request, to a multi-access edge computing (MEC) orchestrator, to delete the application multiple context for the device; and transmit a deleted response for the device application based on the authorization of the request, wherein the response includes an identifier of the application multiple context.

In Example 5, the subject matter of Examples 1-4 includes, wherein the processing circuitry is further configured to perform operations to: obtain a request, from the device application, to update the application multiple context of the application, the request include a multiple context identifier and modified data; determine the application multiple context of the application based on the multiple context identifier; update the application multiple context based on the modified data; and transmit an updated response to the device application based on the authorization of the request, wherein the response includes an identifier of the application multiple context.

In Example 6, the subject matter of Example 5 includes, wherein the modified data is an updated call back reference.

In Example 7, the subject matter of Examples 1-6 includes, wherein the processing circuitry is further configured to perform operations to: transmit a publish message to a MEC host, wherein the publish message include the application multiple context of the application; and transfer the application multiple context of the application to the MEC host.

Example 8 is a method of a lifecycle management (LCM) proxy, comprising: obtaining a request, from a device application, for an application multiple context of an application; determining the application multiple context for the application; authorizing the request from the device application for the application multiple context for the application; adding a device application identifier based on the request to the application multiple context; and transmitting, to the device application, a created response for the device application based on the authorization of the request, wherein the response includes, an identifier of the application multiple context.

In Example 9, the subject matter of Example 8 includes, wherein determining the application multiple context for the application comprises creating the application multiple context of the application, wherein the application multiple context comprises a reference to the application and to the device application.

In Example 10, the subject matter of Examples 8-9 includes, wherein determining the application multiple context for the application comprises determining an existing application multiple context for the application exists, wherein the identifier identifies the existing application multiple context for the application.

In Example 11, the subject matter of Examples 8-10 includes, obtaining a request, from the device application, to delete the application multiple context of the application; authorizing the request to delete the application multiple context from the device application for the application multiple context for the application; transmitting a request, to a multi-access edge computing (MEC) orchestrator, to delete the application multiple context for the device; and encoding a deleted response for the device application based on the authorization of the request, wherein the response includes an identifier of the application multiple context.

In Example 12, the subject matter of Examples 8-11 includes, obtaining a request, from the device application, to update the application multiple context of the application, the request include a multiple context identifier and modified data; determining the application multiple context of the application based on the multiple context identifier; updating the application multiple context based on the modified data; and transmitting, to the device application, an updated response for the device application based on the authorization of the request, wherein the response includes an identifier of the application multiple context.

In Example 13, the subject matter of Example 12 includes, wherein the modified data is an updated call back reference.

In Example 14, the subject matter of Examples 8-13 includes, obtaining a publish message from a MEC host, wherein the publish message include the application multiple context of the application; and transferring the application multiple context of the application to the MEC host.

Example 15 is at least one machine-readable storage device comprising instructions stored thereupon, which when executed by a processing circuitry of a computing device, cause the processing circuitry to: obtain a request, from a device application, for an application multiple context of an application; determine the application multiple context for the application; authorize the request from the device application for the application multiple context for the application; add a device application identifier based on the request to the application multiple context; and transmit, to the device application, a created response for the device application based on the authorization of the request, wherein the response includes, an identifier of the application multiple context.

In Example 16, the subject matter of Example 15 includes, wherein to determine the application multiple context for the application the processing circuitry is configured to create the application multiple context of the application, wherein the application multiple context comprises a reference to the application and to the device application.

In Example 17, the subject matter of Examples 15-16 includes, wherein to determine the application multiple context for the application the processing circuitry is configured to determine an existing application multiple context for the application exists, wherein the identifier identifies the existing application multiple context for the application.

In Example 18, the subject matter of Examples 15-17 includes, wherein the processing circuitry is further configured to: obtain a request, from the device application, to delete the application multiple context of the application; authorize the request to delete the application multiple context from the device application for the application multiple context for the application; transmit a request, to a multi-access edge computing (MEC) orchestrator, to delete the application multiple context for the device; and transmit, to the device application, a deleted response for the device application based on the authorization of the request, wherein the response includes an identifier of the application multiple context.

In Example 19, the subject matter of Examples 15-18 includes, wherein the processing circuitry is further configured to: obtain a request, from the device application, to update the application multiple context of the application, the request include a multiple context identifier and modified data; determine the application multiple context of the application based on the multiple context identifier; update the application multiple context based on the modified data; and transmit, to the device application, an updated response for the device application based on the authorization of the request, wherein the response includes an identifier of the application multiple context.

In Example 20, the subject matter of Example 19 includes, wherein the modified data is an updated call back reference.

In Example 21, the subject matter of Examples 15-20 includes, wherein the processing circuitry is further configured to: obtain a publish message from a MEC host, wherein the publish message include the application multiple context of the application; and transfer the application multiple context of the application to the MEC host.

Example 22 is a lifecycle management (LCM) proxy apparatus, comprising: means to obtain a request, received from a device application, for an application multiple context of an application; means to determine the application multiple context for the application; means to authorize the request from the device application for the application multiple context for the application; means to add a device application identifier based on the request to the application multiple context; and means to transmit a created response for the device application based on the authorization of the request, wherein the response includes, an identifier of the application multiple context.

In Example 23, the subject matter of Example 22 includes, wherein the means to determine the application multiple context for the application comprises operations to create the application multiple context of the application, wherein the application multiple context comprises a reference to the application and to the device application.

In Example 24, the subject matter of Examples 22-23 includes, wherein the means to determine the application multiple context for the application comprises operations to determine an existing application multiple context for the application exists, wherein the identifier identifies the existing application multiple context for the application.

In Example 25, the subject matter of Examples 22-24 includes, means to obtain a request, from the device application, to delete the application multiple context of the application; means to authorize the request to delete the application multiple context from the device application for the application multiple context for the application; means to transmit a request, to a multi-access edge computing (MEC) orchestrator, to delete the application multiple context for the device; and means to transmit, to the device application, a deleted response for the device application based on the authorization of the request, wherein the response includes an identifier of the application multiple context.

Example 26 is at least one machine-readable medium including instructions that, when executed by processing circuitry, cause the processing circuitry to perform operations to implement of any of Examples 1-25.

Example 27 is at least one machine-readable storage medium, comprising information representative of instructions that, when executed by processing circuitry, cause the processing circuitry to, perform the operations of any of Examples 1-25.

Example 28 may include one or more non-transitory computer-readable media comprising instructions to cause an electronic device, upon execution of the instructions by one or more processors of the electronic device, to perform one or more elements of a method described in or related to any of Examples 1-25, or any other method or process described herein.

Example 29 may include an apparatus comprising logic, modules, or circuitry to perform one or more elements of a method described in or related to any of Examples 1-25, or any other method or process described herein.

Example 30 may include a method, technique, or process as described in or related to any of Examples 1-25, or portions or parts thereof Example 31 may include an apparatus comprising: one or more processors and one or more computer readable media comprising instructions that, when executed by the one or more processors, cause the one or more processors to perform the method, techniques, or process as described in or related to any of Examples 1-25, or portions thereof Example 32 may include a signal as described in or related to any of examples 1-25, or portions or parts thereof.

Example 33 may include a signal in a wireless network as described in or related to any of Examples 1-25, or as otherwise shown and described herein.

Example 34 may include a method of coordinating communications in a wireless network as described in or related to any of Examples 1-25, or as otherwise shown and described herein.

Example 35 may include a device for processing communication as described in or related to any of Examples 1-25, or as otherwise shown and described herein.

Example 36 is a network comprising respective devices and device communication mediums for performing any of the operations of Examples 1-25, or as otherwise shown and described herein.

Example 37 is an edge cloud computing device implementation comprising processing nodes and computing units adapted for performing any of the operations of Examples 1-25, or as otherwise shown and described herein.

Example 38 is an apparatus comprising means to implement of any of Examples 1-37.

Example 39 is a system to implement of any of Examples 1-37.

Example 40 is a method to implement of any of Examples 1-37.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus of a service coordinating entity in a Multi-access Edge Computing (MEC) system, comprising:
   processing circuitry; and
   a memory device including instructions embodied thereon, wherein the instructions, which when executed by the processing circuitry, configure the processing circuitry to perform operations to:
   instantiate a first Multiple Application Context based on a request from a device application, the first Multiple Application Context including a MEC application of a first MEC host and a data structure with at least one configuration of the device application, the MEC application providing a service of the first Multiple Application Context consumed by the device application;
   detect a computing device associated with the device application is moving outside a coverage area of the first MEC host to a coverage area of a second MEC host; and
   encode a request for transmission to the second MEC host, the request causing the second MEC host to provide the service using a second Multiple Application Context with the at least one configuration of the device application when the computing device is outside the coverage area of the first MEC host.

2. The apparatus of claim 1, wherein the first Multiple Application Context includes a first set of device applications including the device application associated with the computing device, and a second set of MEC applications including the MEC application of the first MEC host.

3. The apparatus of claim 2, wherein the first set of device applications and the second set of MEC applications are associated with the first Multiple Application Context based on end-to-end latency associated with a communication link between the computing device and the first MEC host.

4. The apparatus of claim 2, wherein the processing circuitry is configured to perform operations to:
determine a MEC application provided by a third MEC host is a supplementary application to the first set of device applications or the second set of MEC applications.

5. The apparatus of claim 4, wherein the processing circuitry is configured to perform operations to:
encode an application context subscribe request for transmission to the third MEC host, the application context subscribe request causing inclusion of the MEC application provided by the third MEC host into the first Multiple Application Context for use by the first set of device applications or the second set of MEC applications.

6. The apparatus of claim 1, wherein the request is an application context publish request transmitted to the second MEC host.

7. The apparatus of claim 6, wherein the application context publish request causes instantiation of the second Multiple Application Context within a coverage area of the second MEC host.

8. The apparatus of claim 1, wherein the request is an application context subscribe request transmitted to the second MEC host.

9. The apparatus of claim 8, wherein the application context subscribe request causes inclusion of a MEC application of the second MEC host into the second Multiple Application Context.

10. The apparatus of claim 9, wherein the MEC application of the second MEC host provides the service consumed by the device application.

11. The apparatus of claim 1, wherein the at least one configuration of the device application is associated with the computing device and at least a second computing device of a plurality of computing devices in the MEC system.

12. At least one non-transitory machine-readable storage medium comprising instructions stored thereupon, which when executed by processing circuitry of a service coordinating entity in a Multi-access Edge Computing (MEC) system, cause the processing circuitry to perform operations comprising:
instantiating a first Multiple Application Context based on a request from a device application, the first Multiple Application Context including a MEC application of a first MEC host and a data structure with at least one configuration of the device application, the MEC application providing a service of the first Multiple Application Context consumed by the device application;
detecting a computing device associated with the device application is moving outside a coverage area of the first MEC host to a coverage area of a second MEC host; and
encoding a request for transmission to the second MEC host, the request causing the second MEC host to provide the service using a second Multiple Application Context with the at least one configuration of the device application when the computing device is outside the coverage area of the first MEC host.

13. The machine-readable storage medium of claim 12, wherein the first Multiple Application Context includes a first set of device applications including the device application associated with the computing device, and a second set of MEC applications including the MEC application of the first MEC host.

14. The machine-readable storage medium of claim 13, wherein the first set of device applications and the second set of MEC applications are associated with the first Multiple Application Context based on end-to-end latency associated with a communication link between the computing device and the first MEC host.

15. The machine-readable storage medium of claim 13, wherein the instructions further cause the processing circuitry to perform operations comprising:
determining a MEC application provided by a third MEC host is a supplementary application to the first set of device applications or the second set of MEC applications.

16. The machine-readable storage medium of claim 15, wherein the instructions further cause the processing circuitry to perform operations comprising:
encoding an application context subscribe request for transmission to the third MEC host, the application context subscribe request causing inclusion of the MEC application provided by the third MEC host into the first Multiple Application Context for use by the first set of device applications or the second set of MEC applications.

17. The machine-readable storage medium of claim 12, wherein the request is an application context publish request transmitted to the second MEC host.

18. The machine-readable storage medium of claim 17, wherein the application context publish request causes instantiation of the second Multiple Application Context within a coverage area of the second MEC host.

19. The machine-readable storage medium of claim 12, wherein the request is an application context subscribe request transmitted to the second MEC host.

20. The machine-readable storage medium of claim 19, wherein the application context subscribe request causes inclusion of a MEC application of the second MEC host into the second Multiple Application Context.

21. The machine-readable storage medium of claim 20, wherein the MEC application of the second MEC host provides the service consumed by the device application.

22. The machine-readable storage medium of claim 12, wherein the at least one configuration of the device application is associated with the computing device and at least a second computing device of a plurality of computing devices in the MEC system.

* * * * *